(12) United States Patent
Sawatzki et al.

(10) Patent No.: US 11,458,825 B2
(45) Date of Patent: Oct. 4, 2022

(54) BATTERY AND SEAT ASSEMBLY FOR A HYBRID MOTOR VEHICLE

(71) Applicant: Ford Global Technologies, LLC, Dearborn, MI (US)

(72) Inventors: Marius Sawatzki, Pulheim/NRW (DE); Joergen Hilmann, Leverkusen/NRW (DE); Daniel Meckenstock, Wuppertal/NRW (DE); Simon Jesse, Braintree (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 270 days.

(21) Appl. No.: 16/807,212

(22) Filed: Mar. 3, 2020

(65) Prior Publication Data

US 2020/0290445 A1    Sep. 17, 2020

(30) Foreign Application Priority Data

Mar. 6, 2019 (DE) .......................... 102019203042.4

(51) Int. Cl.
*B60K 1/04* (2019.01)
*B60N 2/005* (2006.01)
(Continued)

(52) U.S. Cl.
CPC ................ *B60K 1/04* (2013.01); *B60L 50/64* (2019.02); *B60N 2/005* (2013.01); *B60N 2/502* (2013.01);
(Continued)

(58) Field of Classification Search
CPC .............. B60K 1/04; B60K 2001/0405; B60K 2001/0422; B60K 2001/0433; B60L 50/64; B60N 2/502; B60Y 2306/01
(Continued)

(56) References Cited

U.S. PATENT DOCUMENTS 6,902,020 B2 * 6/2005 Kronner .................. B60R 16/04
  180/68.5
8,556,016 B2 * 10/2013 Yoda ........................ B60K 1/04
  180/68.5
(Continued)

FOREIGN PATENT DOCUMENTS

CN       103264633 B1    7/2016
EP         2620353 A1    7/2013
(Continued)

OTHER PUBLICATIONS

Arcus, "A Tale of 3 Battery Packs", Tesla Model S Battery vs Nissan LEAF Battery vs Chevy Volt Battery, Jan. 6, 2016, https://cleantechnica.com/2016/01/06/a-tale-of-3-battery-packs/.
(Continued)

*Primary Examiner* — John D Walters
*Assistant Examiner* — Hilary L Johns
(74) *Attorney, Agent, or Firm* — Frank A. MacKenzie; Bejin Bieneman PLC

(57) ABSTRACT

An assembly for a hybrid motor vehicle, in particular a partially electrified hybrid motor vehicle, having a vehicle battery and a vehicle seat comprising a seat surface. The vehicle seat is connected or connectable to a vehicle floor of the hybrid motor vehicle by means of a substructure having at least two seat rails. The vehicle battery is arranged or arrangeable beneath the vehicle seat and above the vehicle floor. The vehicle battery is held on the vehicle seat by means of a suspension means attached to the top side, or in an upper region, of the vehicle battery.

12 Claims, 2 Drawing Sheets

(51) Int. Cl.
*B60L 50/64* (2019.01)
*B60N 2/50* (2006.01)

(52) U.S. Cl.
CPC ... *B60K 2001/0405* (2013.01); *B60Y 2306/01* (2013.01)

(58) Field of Classification Search
USPC .......................................................... 180/271
See application file for complete search history.

(56) References Cited

U.S. PATENT DOCUMENTS

| | | | | |
|---|---|---|---|---|
| 8,939,242 | B2* | 1/2015 | Kurakawa | H01M 50/20 180/65.1 |
| 9,636,984 | B1 | 5/2017 | Baccouche et al. | |
| 10,150,346 | B2* | 12/2018 | Koyama | B62D 25/20 |
| 10,399,425 | B2* | 9/2019 | Okamura | B62D 21/02 |
| 10,486,515 | B2* | 11/2019 | Saeki | B62D 25/20 |
| 10,710,635 | B2* | 7/2020 | Lowery, Jr. | B62D 21/183 |
| 10,994,785 | B2* | 5/2021 | Deckard | B60N 2/01 |
| 2001/0017462 | A1* | 8/2001 | Abels | B62D 33/06 180/271 |
| 2010/0101881 | A1* | 4/2010 | Yoda | B60K 6/28 180/68.5 |
| 2011/0300426 | A1 | 12/2011 | Iwasa et al. | |
| 2013/0299257 | A1 | 11/2013 | Erladcher et al. | |
| 2014/0124277 | A1* | 5/2014 | Kurakawa | B60K 1/04 180/65.1 |
| 2014/0194049 | A1* | 7/2014 | Kumagai | B60L 58/26 454/143 |
| 2017/0174069 | A1* | 6/2017 | Oyama | B60R 21/131 |
| 2017/0217296 | A1* | 8/2017 | Nomura | B62D 21/152 |
| 2017/0334278 | A1* | 11/2017 | Yamamoto | B62D 25/2027 |
| 2020/0282818 | A1* | 9/2020 | Hilmann | B60N 2/005 |
| 2021/0273275 | A1* | 9/2021 | Takahashi | H01M 10/6566 |

FOREIGN PATENT DOCUMENTS

| | | |
|---|---|---|
| JP | 2000238541 A | 9/2000 |
| JP | 201488068 A | 5/2014 |
| KR | 1020120012656 A | 2/2012 |
| WO | 2004071798 A1 | 8/2004 |
| WO | 2013053433 A1 | 4/2013 |

OTHER PUBLICATIONS

Massari, "7 Hidden Features of the Audi Q7", AudiWorld, Aug. 18, 2016, https://www.audiworld.com/articles/7-hidden-features-audi-q7/.

* cited by examiner

BATTERY AND SEAT ASSEMBLY FOR A HYBRID MOTOR VEHICLE

CROSS-REFERENCE TO RELATED APPLICATION

This patent application claims priority to German Application No. DE 102019203042.4 filed on Mar. 6, 2019, which is hereby incorporated by reference in its entirety.

BACKGROUND

A widespread variant of a hybrid motor vehicle is the so-called mild hybrid. Although an electric motor is also used in the case of so-called partially electrified hybrid motor vehicles (known as "mild hybrid" or "mHEV" vehicles), its torque and battery power are not sufficient on their own to drive the motor vehicle. The electric motor merely assists the internal combustion engine for the purpose of increasing power, but fully electric driving in this way is not possible. However, the mild hybrid has good fuel-saving potential, and in addition can be integrated into existing vehicle concepts with little resource application, while full hybrids require greater development resource application. The vehicle battery for such mild hybrids is typically designed as a 48-volt battery.

In such a mild hybrid vehicle, storage space for the 48-volt battery, which is both safe and practicable, is limited. Studies have shown that there is a suitable space for the vehicle battery under the driver's seat. Typically, however, this entails further limitations, for example, because there is then no space beneath the driver's seat for servomotors, which allow automatic adjustment of the driver's seat. The arrangement of the vehicle battery under the driver's seat therefore typically limits the adjustability of the driver's seat to mechanical devices.

In the event of various types of impact, a deformation zone, or crumple zone, may protect the vehicle electronics including the vehicle battery from deformation. A crumple zone in the area of the driver's seat is typically tested by means of the post impact test. This simulates a side collision in which the vehicle is thrown sideways against rigid objects such as trees or posts. The desired deformation of the crumple zone is intended to minimize the effects on the driver and on the vehicle battery underneath. This desired deformation causes the vehicle floor below the driver's seat to bend downwards. If the vehicle battery were to rest on the vehicle floor, it would also sink, or be pulled down, increasing the risk of deformation or damage to the vehicle battery.

Various solutions are proposed in the prior art to protect the driver and/or the vehicle battery in the event of a collision of the vehicle.

US 2013/0299257 A1 relates to a housing for accommodating the vehicle battery, which housing is arranged entirely beneath the vehicle seats. The seat rails of the vehicle seats are mounted on the top side of the housing, with recesses being provided for the adjustment means of the vehicle seats, or for the feet of an occupant on a rear seat of the vehicle. The housing may have a lateral honeycomb structure to reinforce, or stiffen, the housing.

In WO 2004/071798 A1, the vehicle battery is arranged under an entire row of seats, preferably the rear seat row. In order to still have space for seat rails, along which the seats can be slid in the longitudinal direction of the vehicle, the vehicle battery is divided into a plurality of subunits, each sub-unit being arranged under one of the vehicle seats of the corresponding row of seats.

JP 2000 238 541 A discloses two vehicle batteries arranged under two vehicle seats and symmetrically with respect to the longitudinal axis of the vehicle. The batteries are connected to an additional stiffened vertical strut of the vehicle body, which can reduce or prevent mechanical effects on the vehicle batteries during a lateral impact.

In CN 103264633 B, the vehicle batteries are arranged on rails under the vehicle seats, such that the vehicle batteries are movable in the longitudinal direction of the vehicle. On the one hand, this simplifies the removal and installation of the batteries, but on the other hand the greater mobility in the longitudinal direction of the vehicle reduces a deforming action upon the battery housing, for example in the event of a head-on collision.

WO 2013/053433 A1 describes a body structure that protects the traction battery, in an underbody of a vehicle, from damage in the event of vehicle collisions. In this case, a self-supporting battery box, stiffened with circumferential supports in the form of a frame, is inserted into the battery space in the underbody, with additional deformation space for the door sill, against lateral impact energy, being created by means of lateral intermediate plates. EP 2 620 353 A1 discloses a vehicle floor structure in which the battery space is better protected by additional transverse bracing or transverse stiffeners in the event of a lateral impact.

JP 2014-88068 A discloses an assembly in which a vehicle battery is arranged in an elevated manner beneath the driver's seat, such that the battery is protected from liquids, e.g. spilled drinks. This eliminates the need for a waterproof battery housing, thus enabling the production costs for the vehicle battery to be reduced. For this purpose, the vehicle battery rests with a lower side flat on a holding portion of a holding device, which can be realized with a U-shaped cross section, as bent sheet metal or cast from hard plastic. The limb ends of the U-shape hang as a fastening portion for fastening to an underside of the vehicle seat or to the seat rails. The vibrations and shocks that occur during travel are absorbed by cushioning material arranged between the holding portion and the battery housing.

In view of the indicated prior art, therefore, there is still room for improvement in the protection of the vehicle battery in the event of vehicle collisions. Rigid boxes or bracing can protect the vehicle battery from direct mechanical impact, but at the same time they reduce the effectiveness of the deformation zone. However, there must be no risk of damaging the vehicle battery as a result of the deformation process.

SUMMARY

The present disclosure relates to an assembly for a hybrid motor vehicle, e.g., for a partially electrified hybrid motor vehicle, which has a vehicle battery and a vehicle seat. The vehicle battery is arranged or arrangeable beneath the vehicle seat and above the vehicle floor.

The disclosed assembly can protect the vehicle battery of a hybrid motor vehicle, and at the same time optimize the deformation zone of the motor vehicle in the event of a lateral impact.

It must be pointed out that the features and measures listed individually in the following description can be combined with each other in any technically meaningful way and indicate further developments of the disclosure. The description additionally characterizes and specifies the disclosure, in connection with the figures. The terms "above" and "beneath" or "top" and "bottom" are to be understood in relation to an operating position of the vehicle. The term "vehicle battery" includes the battery itself, but also, where appropriate, associated housings or battery cages or protective cages connected to the battery. "Vehicle transverse direction" means a substantially horizontal direction transverse to the vehicle longitudinal axis. The disclosure relates to the driver's seat, but according to the disclosure the vehicle battery may also be arranged beneath any other vehicle seat in the vehicle.

The disclosure relates to an assembly for a hybrid motor vehicle, in particular a partially electrified hybrid motor vehicle, having a vehicle battery and a vehicle seat comprising a seat surface. The vehicle seat can be indirectly or directly connected or connectable to a vehicle floor of the hybrid motor vehicle by means of a substructure having at least two seat rails. The vehicle battery in this case is arranged or arrangeable beneath the vehicle seat and above the vehicle floor. In other words, the vehicle battery is arranged or arrangeable between the vehicle seat, e.g., the seat surface, and the vehicle floor. The vehicle battery is suspended from the vehicle seat by means of a suspension means attached to the top side or in an upper region of the vehicle battery.

The suspension means secures the vehicle battery against slipping, and may also fully or mostly support the total weight of the vehicle battery. The vehicle battery therefore no longer has to rest with an underside on the vehicle floor, or on any other holding means of the vehicle seat, but for example can be arranged without contact with respect to the vehicle floor. In other words, the underside of the vehicle battery does not have to be supported by the vehicle floor or any other holding means of the vehicle seat. If the vehicle floor deforms by bending downwards, the suspension means can prevent the vehicle battery from being pulled downwards, i.e., dropping. Since the vehicle battery no longer rests on the vehicle floor, the risk of deformation or other damage to the vehicle battery can be reduced.

In contrast to supporting of the vehicle battery on the underside, the top-side suspension allows saving of material, since the total weight of the vehicle battery can be divided amongst various suspension means, which require only a small surface area for attachment to the vehicle battery. Irrespective of the external shape of the vehicle battery, or of a housing, the attachment of the vehicle battery by means of a suspension means can thus also be used as an additional battery cage/protective cage of the vehicle battery. By using suspension means to support the vehicle battery, the housing for the battery cage/protective cage can be designed more flexibly, e.g., without a flat wall on the underside of the housing. Suspension means are typically characterized by the fact that they have a certain amount of movement play in the event of vibration or other shocks, which compensates for the vibration. This can prevent the transmission of vibration or other shocks, e.g. during travel over cobblestones, which can make additional padding of the vehicle battery or around the vehicle battery unnecessary. The vehicle battery is fastened, or mounted, in a quasi-movable manner.

In an embodiment of the assembly, the substructure of the seat surface of the vehicle seat defines a battery protection space. The battery protection space may be open at the bottom, e.g., for receiving the vehicle battery. The vehicle battery may be wholly or partially arranged or received in the battery protection space.

Essential protective elements of the battery protection space for protection against lateral impact are the seat rails. In case of a lateral impact, e.g. against a tree or post, there is a protective frame provided around the vehicle battery, beneath the seat surface in the region of the substructure, substantially parallel to the seat surface, or to the vehicle floor, which protect the vehicle battery from uncontrolled action in a transverse direction of the vehicle. The seat structure that surrounds the battery protection space must have sufficient rigidity to prevent unwanted deformation of the seat structure and of the battery housing/battery cage, or of the vehicle battery located therein. The battery protection space need not completely surround the vehicle battery in all directions, such that deformation space remains for controlled deformation to protect the vehicle occupants in the event of a lateral impact. The selected configuration of the components must therefore be such that as much free space as possible is available within the vehicle for controlled deformation in the event of a lateral impact, to enable the vehicle body to absorb the required amount of kinetic energy by means of deformation of the predetermined crash structure of the vehicle.

A first deformation space may be provided within the battery protection space, above or in an upper region of the vehicle battery.

In the event of deformation of the surrounding component, the vehicle battery can deflect wholly or partially into the first deformation space. This first deformation space, or deformation clearance, or compensation space, or movement clearance, is defined by a distance between the vehicle battery and the substructure of the vehicle seat. Deformation spaces need not necessarily be "empty" for an effective crumple zone. However, only components whose deformation does not additionally endanger the safety of the vehicle occupants may be installed there. The first deformation space, together with a partially elastic suspension system, enables the vehicle battery to be stored in a flexible manner beneath the seat surface. The gap between the vehicle battery and the substructure, e.g., the seat rails, allows compensating movements of the vehicle battery to compensate vibration or other shocks during travel. At the same time, the gap between the vehicle battery and the substructure allows this compensation space to be used as a deformation space for controlled deformation in the event of a vehicle impact. This is to be understood to mean that the vehicle battery itself does not deform, while still being movable in order to absorb kinetic energy or deformation energy in the event of a vehicle impact, for the purpose of protecting the occupants of the vehicle.

Additionally or alternatively, a second deformation space, e.g., for a deformation movement in or along a transverse direction of the vehicle, can be realized beneath the battery protection space by a distance between the vehicle battery and a vehicle floor.

This second deformation space also serves to improve the protection of the vehicle occupants without compromising the safety of the vehicle battery. For the second deformation space, for example, the seat rails are separated from the vehicle floor by a distance that can allow for movement in or along the vehicle transverse direction of the door sill or other vehicle components, e.g., cross struts beneath the seat structure, in the event of a lateral impact of the vehicle. A controlled movement of the door sill, e.g., in a second deformation space beneath the protective cage of the vehicle seat, is desirable in principle. With movement of the door sill, a stop can thus be realized in a stop region of the vehicle battery in the transverse direction of the vehicle. The stop region can be located outside and/or beneath the battery protection space. With this stop being realized in the event of deformation of the vehicle as a result of a lateral impact, the door sill or a movement of the door sill displaces the vehicle battery in the region of the first deformation space, e.g., between the vehicle battery and the substructure of the vehicle seat, and in the region of the second deformation space, e.g., beneath the seat rails.

The suspension means may have one or more suspension brackets or other suspension elements. A first portion of the suspension bracket may be connected to the vehicle battery, and a second portion of the suspension bracket may be connected to a seat rail and/or to the substructure of the vehicle seat.

The suspension brackets bridge the first deformation space. and, if the suspension brackets are of an elastic design, enable the vehicle battery to move elastically within this first deformation space. The suspension means can allow a relative movement of the vehicle battery relative to the vehicle seat. For example, the suspension brackets may be of an elastic design, which can enable the vehicle battery to move elastically within the first deformation space. This relative movement not only can allow elastic compensation movements of the vehicle battery with respect to vibration or other shocks, but also can also be used for controlled deformation of the vehicle in the event of a lateral impact.

The first portion of the suspension bracket(s) may be connected at the top, or in an upper region, of the vehicle battery. The first portion forms a flat contact with the vehicle battery for the purpose of suspension.

Having the first portions of the suspension brackets designed as small-format perforated plates makes it possible, for example, to use screws for connecting the suspension brackets to the vehicle battery. Connected to these perforated plates is a bracket, realized as a strand-like connecting portion, arranged at the end of which, opposite the first portion, is the second portion. The second portion can fasten the suspension bracket to the vehicle seat. This type of suspension is easy to assemble and disassemble, thus reducing maintenance costs.

The suspension bracket(s) may be deformable in a predetermined manner in a transverse direction of the vehicle in the event of a lateral impact of the hybrid motor vehicle, e.g., with the vehicle battery being carried along by the door sill. Such a design of the suspension brackets further improves the safety of the vehicle battery and the vehicle occupants in the event of a lateral impact.

Additionally or alternatively, the suspension brackets may include at least two limbs having a V-shape. The limbs may be able to open and/or close when the vehicle battery is moved in the transverse direction of the vehicle. The configuration of the opening and/or closing can be determined in advance by suitable choice of material or, for example, design of the cross-section of the limbs. If necessary, additional predetermined breaking points may be provided.

In addition, the vehicle seat may have at least one transverse connection or transverse stiffening between two seat rails of the vehicle seat, which can stiffen the assembly in a transverse direction of the vehicle. That is, the additional transverse stiffening between the seat rails is intended to increase the structural rigidity of the assembly.

SUMMARY OF THE DRAWINGS

Further advantageous developments of the disclosure are disclosed in the subordinate claims and the following description of the figures, in which:

DESCRIPTION

Figure 1:
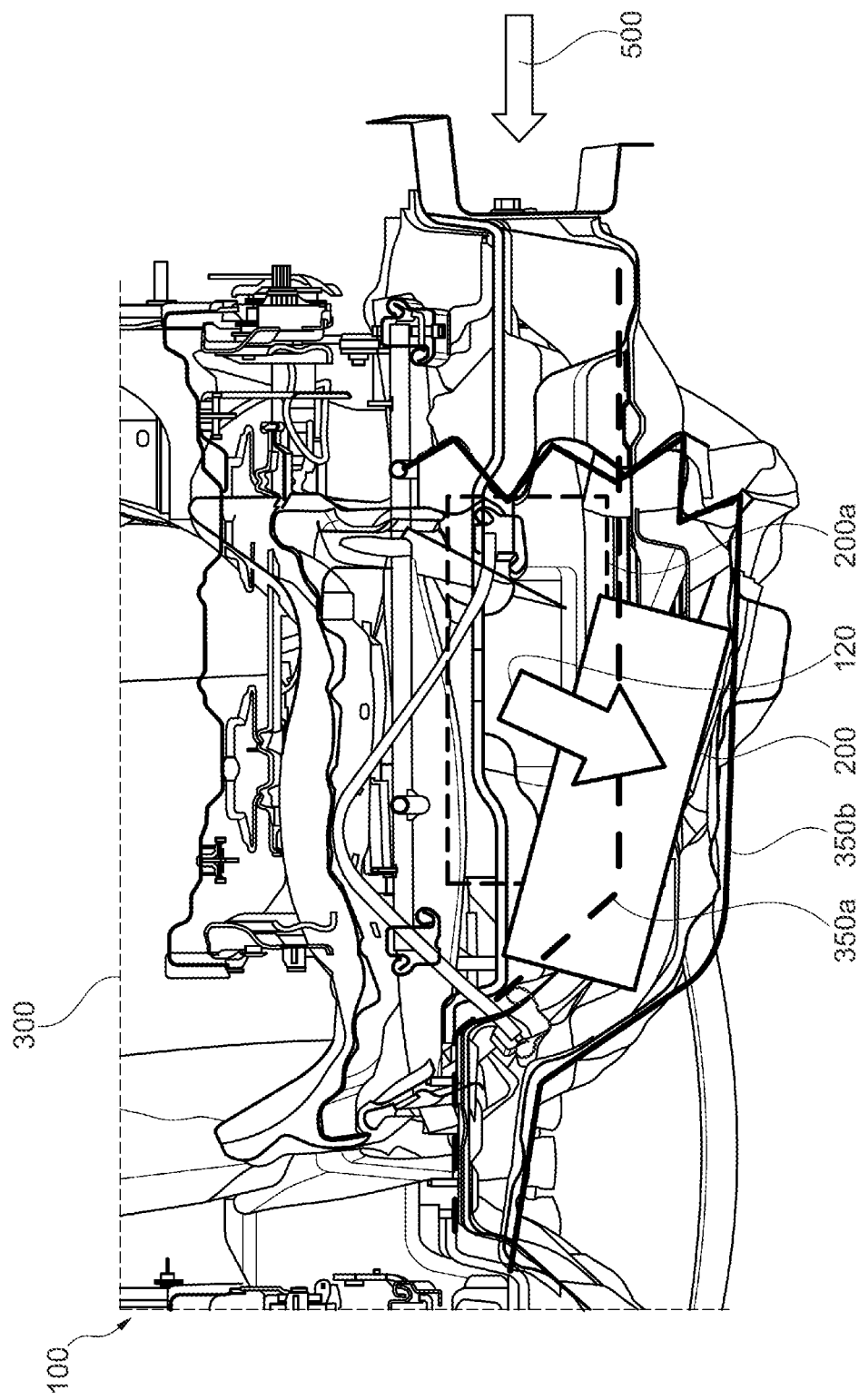
FIG. 1 shows a partially sectional front view of an assembly from the prior art.

In the different figures, identical parts are always denoted by the same reference numerals, for which reason they are also usually described only once. In particular, the figures are to be understood in the sense that different components are masked or simplified, to improve clarity. Even if the vehicle battery is shown in a simplified cuboid shape, it or the housing or battery cage/protective cage surrounding it may be of any suitable external shape.

The front view of FIG. 1 shows an assembly 100, comprising a vehicle battery 200 and a vehicle seat 300. Represented in the figure is the effect of a side vehicle impact 500, i.e. an impact in a transverse direction of the vehicle, upon the vehicle battery 200, which is arranged between the vehicle floor 350*a*, 350*b* and the vehicle seat 300. A broken line indicates the non-deformed vehicle floor 350*a*, on which the position of the vehicle battery 200*a* before the impact 500 is indicated by a broken line. In the case of a lateral impact 500, there is deformation of the vehicle body 400 (see FIG. 2), and therefore also of the vehicle floor 350*b*, on which the vehicle battery 200 is supported and/or fastened. When the vehicle floor 350*b* bends downwards, the vehicle battery 200 also moves downward, e.g., in a direction of movement 120 represented by an arrow shown in FIG. 1. The vehicle battery 200 is pulled downwards by its own weight and/or by the fastening to the bending vehicle floor 350*b*. This presents the risk of the vehicle battery 200, or the housing surrounding it, becoming deformed or otherwise damaged.

Figure 2:
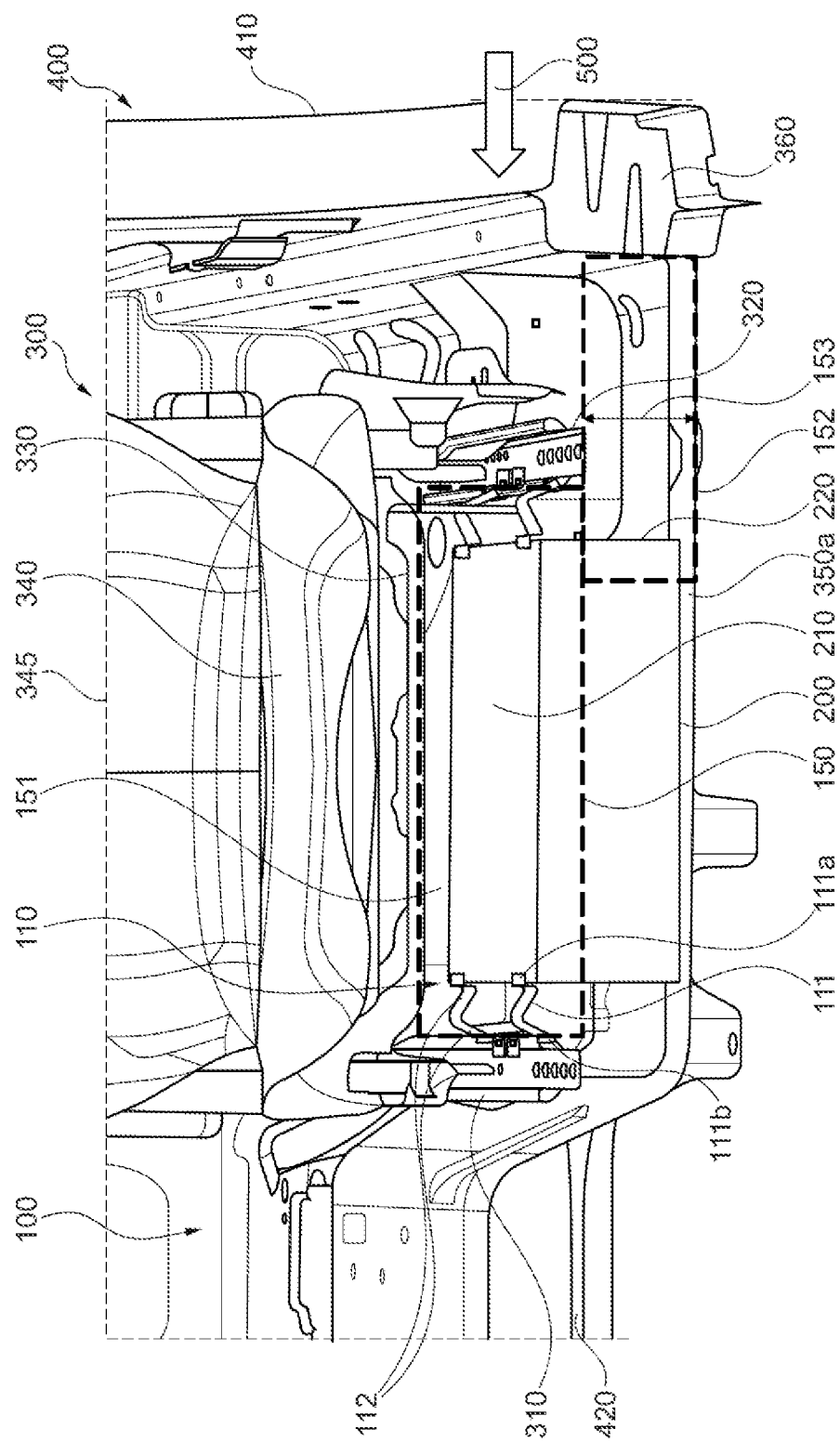
FIG. 2 shows a front view of an exemplary embodiment of an assembly.

The front view of FIG. 2 shows an exemplary assembly 100 comprising a vehicle battery 200 and a vehicle seat 300. Also represented are parts of the vehicle body 400, a number of components of the vehicle having been masked out for reasons of clarity. The vehicle seat 300 has a seat back 345 and a seat shell, having a seat surface 340 for the vehicle occupant. The substructure 330 of the vehicle seat 300 is arranged beneath the seat shell and/or the seat surface 340. The substructure 320 has a first seat rail 310 and a second seat rail 320.The seat rails 310, 320 are arranged at a distance 153 from the vehicle floor 350. In the case of the exemplary embodiment shown in FIG. 2, there are no components provided within the distance 153, except only for carpet on the floor. The substructure 330, together with the two seat rails 310, 320, encloses a downwardly open battery protection space 150. The two seat rails 310, 320 are connected at the front and back to the floor assembly and to the seat cross-members, respectively (not represented in the figure). The two seat rails 310, 320 are the boundaries of the protective battery space 150 in the transverse direction of the vehicle. The entire vehicle battery 200 or, as shown in FIG. 2, part of the vehicle battery 200 (e.g., an upper region 210) is accommodated or arranged in this battery protection space 150. The boundaries of the battery protection space 150 are stiffened against deformation, e.g., in the event of a lateral impact 500 of the vehicle. If, for example, the vehicle door 410 were to move towards the vehicle battery 200 in the event of a lateral impact 500, deformation or damage to the vehicle battery 200 can be prevented by the stiffened substructure 330.

On the other hand, the vehicle floor 350*a* would indeed be deformed in a lateral impact 500, as shown in FIG. 1 by the deformed vehicle floor 350*b*. In order to prevent the vehicle battery 200 from moving in a direction of movement 120

(see FIG. 1), and thus from leaving the battery protection space 150, the vehicle battery 200 is fastened to the vehicle seat 300, e.g., the seat rails 310, 320, in a suspended manner by a suspension means 110. This enables the vehicle battery 200 to be arranged without contact to the vehicle floor 350a. The suspension means 110 includes at least one suspension bracket 111, e.g., four suspension brackets 111 may be used for uniform suspension of the vehicle battery 200, as shown in FIG. 2. The suspension bracket 111 has a first portion 111a connected to a top side and/or to an upper region 210 of the vehicle battery 200. The upper region 210 thus consists at least of the top side of the vehicle battery 200. The suspension bracket 111 further includes a second portion 111b connected to the vehicle seat 300, e.g., to the seat rails 310, 320. The first portion 111a and the second portion 111b can be connected to each other via at least two limbs 112, e.g., bent into a V-shape. The limbs 112 may be made of resilient strand material. The opening of the V-shape, i.e. the free ends of the limbs 112, may be directed upwards or, as shown, downwards. The suspension means 110 may be capable of supporting the entire weight of the vehicle battery 200, e.g., when the vehicle floor 350a bends downwards. The first portions 111a of the suspension brackets 111 may be small-format perforated plates for flat contact against the top side of the vehicle battery 200. This makes it easy to mount the vehicle battery 200 by means of screws, bolts, rivets, etc. for the purpose of connecting the suspension brackets 111 to the vehicle battery 200. However, welding, gluing, etc. would also be conceivable for effecting the joint.

The assembly 100 can contribute to the protection of vehicle occupants by providing additional deformation space in the event of a lateral impact 500 of the vehicle. Therefore, any clearance or any space within the vehicle where deformation is acceptable should be capable of being used for the deformation of the vehicle body 400 in the event of a lateral impact 500. Because the vehicle battery 200 is suspended in the battery protection space 150, the vehicle battery 200 is arranged at a distance from the seat supports 310, 320, or from the substructure 330. This distance defines a first deformation space 151 within the battery protection space 150. The vehicle battery 200 can move in the first deformation space 151 in a manner that is predetermined by the design of the suspension means 110. This serves both to compensate vibration and/or shocks during travel, and to compensate deformation of the vehicle body 400 resulting from a lateral impact 500.

In particular, it is intended that the free space between the vehicle battery 200 and the tunnel 420 should also be used. The tunnel 420 extends along the longitudinal axis of the vehicle and is typically integrally connected to the vehicle floor 350a. A second deformation space 152 may be defined by a distance between the vehicle floor 350a and the battery protection space 150. The second deformation space 152 can allow for movement of the door sill 360 in a transverse direction of the vehicle in the event of a lateral impact 500 of the vehicle. Before the impact 500, the second deformation space 152 is still partially occupied by the vehicle battery 200. When the door sill 360 moves towards the longitudinal axis of the vehicle, i.e. towards the tunnel 420, the door sill 360 can ultimately form a stop 220 with the vehicle battery 200. The door sill 360 moves the vehicle battery 200 in a predetermined manner, e.g., in a transverse direction of the vehicle, with the suspension brackets 111 deforming in a predetermined manner. While the V-shaped bent limbs 112 of the suspension brackets 111 between the vehicle battery 200 and the tunnel 420 close due to the movement of the vehicle battery 200, the V-shaped bent limbs 112 of the suspension brackets 111 in the region of the stop 220 open. This displacement can be continued until the vehicle battery 200 comes against a boundary of the stiffened battery protection space 150, e.g., the first seat rail 310 between the vehicle battery 200 and the tunnel 420, and comes to a stop. The second seat rail 320, on the opposite side of the vehicle battery 200, can prevent a further displacement of the door sill 360, and thus can reduce or prevent further damage or deformation of the vehicle battery 200. Optimum protection is thereby ensured for the vehicle battery 200 in the event of a lateral impact 500, for example, against a tree or a post.

LIST OF REFERENCES 100 assembly
110 suspension means
111 suspension bracket
111a first portion
111b second portion
112 limb
120 direction of movement
150 battery protection space
151 first deformation space
152 second deformation space
153 distance
200 vehicle battery
200a position of the vehicle battery before the impact
210 upper region
220 stop region
300 vehicle seat
310 first seat rail
320 second seat rail
330 substructure
340 seat surface
345 seat back
350a vehicle floor (not deformed)
350b vehicle floor (deformed)
360 door sill
400 vehicle body
410 vehicle door
420 tunnel
500 lateral impact/vehicle impact

The invention claimed is:

1. An assembly for a hybrid motor vehicle, comprising:
a vehicle floor;
a vehicle seat including a substructure having at least two seat rails connected to the vehicle floor, the vehicle seat including a seat surface spaced from the vehicle floor and supported by the substructure;
a vehicle battery disposed between the seat surface and the vehicle floor and spaced from the vehicle floor, the vehicle battery includes a top side spaced from the seat surface; and
suspension means extending from the top side of the vehicle battery to the substructure of the vehicle seat.

2. The assembly of claim 1, wherein the substructure of the seat surface defines a battery protection space, and the vehicle battery is at least partially disposed in the battery protection space.

3. The assembly of claim 2, wherein the battery protection space includes a first deformation space above the vehicle battery, the first deformation space is defined by a distance between the vehicle battery and the substructure of the vehicle seat.

4. The assembly of claim 3, further comprising a second deformation space below the battery protection space, the second deformation space is defined by a distance from the battery protection space to the vehicle floor.

5. The assembly of claim 4, wherein the vehicle battery is moveable relative to the vehicle seat in at least one of the first deformation space and the second deformation space.

6. The assembly of claim 1, wherein the suspension means includes one or more suspension brackets having a first portion and a second portion, the first portion is connected to the top side of the vehicle battery, and the second portion is connected to the substructure of the vehicle seat.

7. The assembly of claim 6, wherein the first portion forms a flat contact with the top side of the vehicle battery.

8. The assembly of claim 6, wherein the one or more suspension brackets deform in a direction transverse to a longitudinal axis of the vehicle based on movement of the vehicle battery.

9. The assembly of claim 6, wherein the one or more suspension brackets include one limb extending from each of the first portion and the second portion, the limbs are connected to each other and have a V-shape.

10. The assembly of claim 9, wherein the limbs bend about an axis extending transverse to a direction transverse to a longitudinal axis of the vehicle based on movement of the vehicle battery.

11. The assembly of claim 1, wherein the vehicle seat includes a transverse connection between two seat rails, the transverse connection extending in a transverse direction of the vehicle.

12. The assembly of claim 1, wherein the suspension means are formed of a resilient material.

* * * * *